(No Model.)
F. F. WARD & F. LINDSEY.
EGG CRATE.
No. 282,810. Patented Aug. 7, 1883.
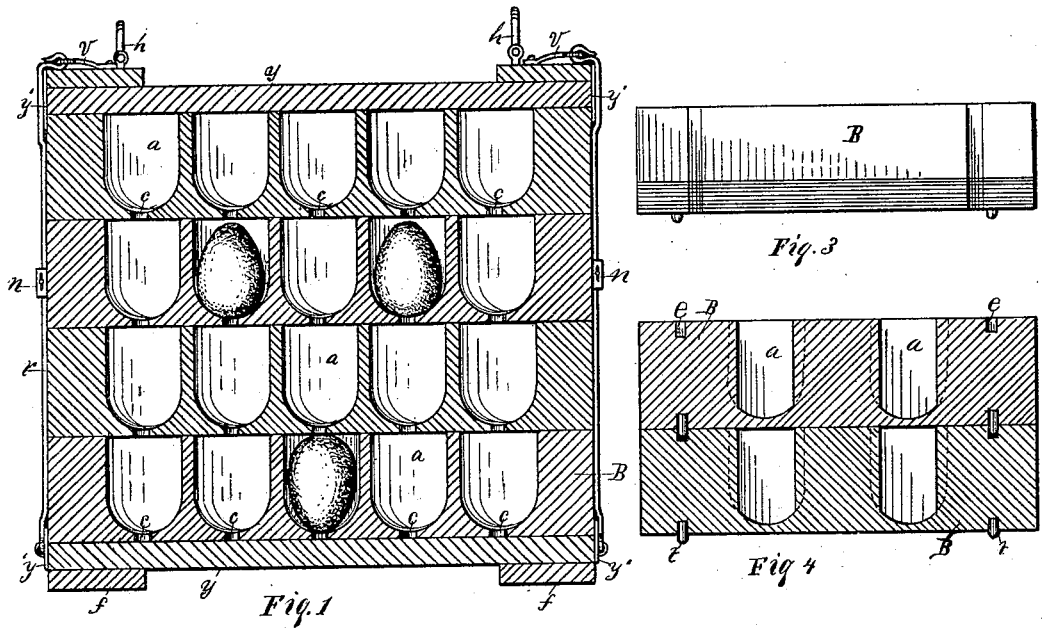
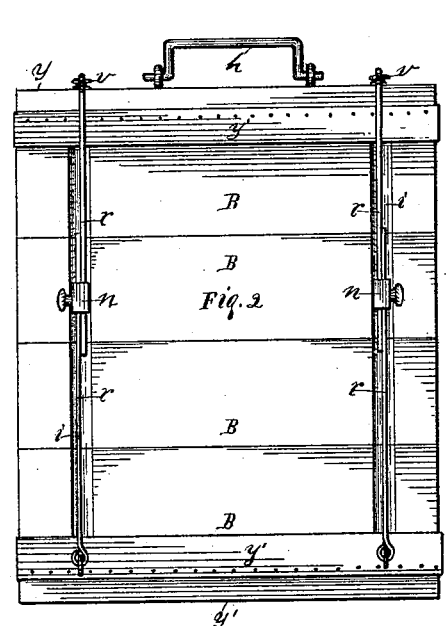
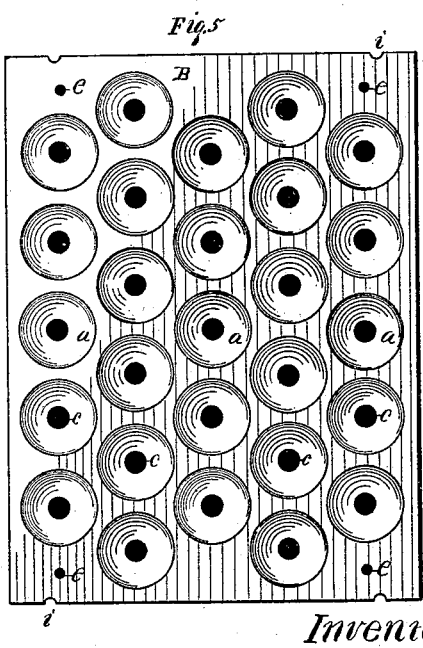
Attest.
Jno. C. Perkins
J. S. Duer
Inventor:
Frank F. Ward & Frank Lindsey
By Lucius C. West
Atty

UNITED STATES PATENT OFFICE.

FRANK F. WARD AND FRANK LINDSEY, OF OTSEGO, MICHIGAN; SAID WARD ASSIGNOR TO BARTLETT A. NEVINS, OF SAME PLACE.

EGG-CRATE.

SPECIFICATION forming part of Letters Patent No. 282,810, dated August 7, 1883.

Application filed December 21, 1882. (No model.)

*To all whom it may concern:*

Be it known that we, FRANK F. WARD and FRANK LINDSEY, citizens of the United States, residing at Otsego, county of Allegan, State of Michigan, have invented a new and useful Egg-Crate, of which the following is a specification.

The object of our invention is to construct an improved egg-crate, the novelty and utility of which is set forth in the following detailed description.

In the drawings, forming a part of this specification, Figure 1 is a longitudinal section through the center of Fig. 5; Fig. 2, an end elevation; Fig. 3, a detached part, showing a change of construction; Fig. 4, a cross-section on a line with holes $e\ e$ in Fig. 5; and Fig. 5 is a top view of one of the trays.

The egg-trays B B of the crate are made from solid blocks of wood, provided with cups $a\ a$, having perforations $c\ c$ through the bottom. The eggs are located in the cups $a\ a$, as in Fig. 1. Each tray may contain as many cups as desired, and the crate may contain as many trays as practical in each. They are located one above another, sitting compactly upon each other. They are provided with holes $e\ e$ and projections $t\ t$, located in said holes, as in Fig. 4, thus keeping them in position. Covers $y\ y$, having a rim, $y'$, are located on the top and bottom of a package of trays. The upper cover is provided with handles $h\ h$.

$r\ r$ are extensible binding-rods jointedly secured to the lower cover, and having an eye at the upper end, in which hooks $v\ v$ are inserted. The rods $r\ r$ are made in two pieces, lapped by each other, and held by a clip and set-screw, as in Fig. 2. By loosening the set-screw they may be extended or shortened to any desired length, and then secured again by tightening said set-screw. Said binding-rods are located in grooves $i\ i$ in the ends of the trays. The object of making said rods extensible is to admit of increasing or decreasing the number of trays in each crate, and to provide for any swelling or shrinking of wood.

If desired, the trays may be made of two blocks of wood placed together, with the grain running in reverse ways to prevent warping, Fig. 3.

Egg-crates thus constructed are very simple, cheaply made, will stand much rough usage without breaking or getting out of order, or breaking the eggs; eggs may be shipped in the winter with little danger of freezing, and each tray constitutes an egg-tester, as they may be detached from all connections and held up to the light, thus enabling one to detect poor eggs by looking through the holes $c\ c$.

Having thus described our invention, what we claim as new, and desire to secure by Letters Patent, is—

1. An egg-crate consisting of wooden trays sitting one upon another, and having cups of sufficient depth to completely receive the eggs, and means for binding said trays together, in combination, substantially as set forth.

2. The combination of the egg-trays, a cover, and the extensible binding-rods jointedly connected at the lower end, and detachably connected with the cover, substantially as described.

3. The egg-trays provided with the holes and projections for keeping them in place, in combination with means for binding the trays together, substantially as described and shown.

4. The egg-trays provided with the cups and the end grooves, in combination with the covers and binding-rods, all substantially as described.

In testimony of the foregoing we have hereunto subscribed our names in the presence of two witnesses.

FRANK F. WARD.
FRANK LINDSEY.

Witnesses:
J. S. DUER,
JNO. C. PERKINS.